United States Patent Office 3,396,160
Patented Aug. 6, 1968

3,396,160
2 - OXO - 4 - (INDOL - 3 - YL) - HEXAHYDRO-1H-AZEPINES AND PROCESSES FOR THEIR PREPARATION
Jackson B. Hester, Jr., Portage, Mich., assignor to The Upjohn Company, Kalamazoo, Mich., a corporation of Delaware
No Drawing. Original application June 22, 1965, Ser. No. 466,102, now Patent No. 3,347,866, dated Oct. 17, 1967. Divided and this application Oct. 24, 1966, Ser. No. 588,713
11 Claims. (Cl. 260—239.3)

This application is a division of application Serial No. 466,102, filed June 22, 1965, now U.S. Patent No. 3,347,866.

This invention relates to novel 2-oxo-4-(indol-3-yl)-hexahydro-1H-azepines, to processes for making the same, and to novel intermediates prepared in the process.

The novel 2-oxo-4-(indol-3-yl)-hexahydro-1H-azepines of the present invention can be represented by the following formula:

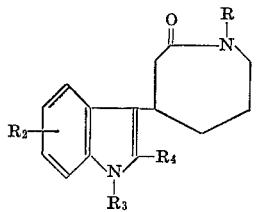

I wherein R, $R_3$, and $R_4$ are hydrogen or alkyl of not more than 4 carbon atoms, and $R_2$ is hydrogen, alkyl of not more than 4 carbon atoms, alkoxy of not more than 4 carbon atoms, or halogen. Examples of alkyl of not more than 4 carbon atoms are methyl, ethyl, propyl, isopropyl, butyl, isobutyl, secondary butyl, and tertiary butyl. Examples of alkoxy are methoxy, ethoxy, propoxy, isopropoxy, butoxy, isobutoxy, secondary butoxy, and tertiary butoxy. Examples of halogen are fluoro, chloro, and bromo.

The compounds of the invention can be prepared by decarboxylating a compound of the following formula:

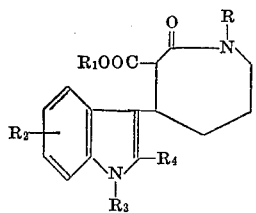

II wherein R, $R_2$, $R_3$, and $R_4$ are as given above, and $R_1$ is hydrogen. The decarboxylation is effected in a manner already known in the art, simply by heating the acid at its melting point under reduced pressure.

The intermediates of Formula II wherein $R_1$ is hydrogen are obtained by hydrolysis of the corresponding esters wherein $R_1$ is alkyl of not more than 4 carbon atoms, for example, methyl, ethyl, propyl, butyl, and isomeric forms thereof. The hydrolysis is effected by heating the ester in a basic aqueous solution, for example, by refluxing in aqueous ethanol to which potassium hydroxide has been added. Other solvents such as aqueous methanol, aqueous tetrahydrofuran, or aqueous propanol and other bases such as sodium hydroxide or lithium hydroxide can be used. The resulting alkali metal salt is converted to the corresponding acid by treatment with mineral acids, for example, hydrochloric or sulfuric acids.

The intermediates of Formula II wherein $R_1$ is alkyl are prepared by reacting with dialkyl malonate, for example, diethyl malonate, a compound of the following formula:

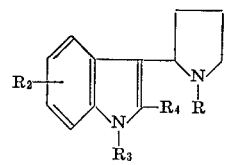

III wherein R, $R_2$, $R_3$, and $R_4$ are as given above. The reaction is carried out in the presence of a strong base, for example, sodium hydroxide, and in an inert solvent, for example, xylene. Other suitable strong bases include sodium, sodium hydride, and potassium hydroxide. Other suitable inert solvents include toluene, chlorobenzene, and decahydronaphthalene. The reaction mixture can be worked up for the recovery of the product by neutralization of the base followed by solvent extraction and/or chromatography and like methods already known in the art. In some instances, two isomeric forms of the compounds of Formula II are obtained. These isomers can be separated by chromatography and/or fractional crystallization, if desired, and both isomers on alkaline hydrolysis followed by acidification yield compounds of Formula II wherein $R_1$ is hydrogen. It is not necessary, however, to effect a separation because mixtures of the two isomers as crude reaction products can be hydrolyzed to give compounds of the invention.

The starting 3-(2-pyrrolidinyl)indoles of Formula III can be prepared by processes already known in the art, for example, Youngdale et al., J. Med. Chem. 7, 415 (1964).

Typical 3-(2-pyrrolidinyl)indoles which can be thus prepared and which can be used as starting compounds for the process of the invention include 3-(2-pyrrolidinyl)indole,
1-methyl-3-(2-pyrrolidinyl)indole,
3-(1-methyl-2-pyrrolidinyl)indole,
3-(1-ethyl-2-pyrrolidinyl)indole,
1-methyl-3-(1-methyl-2-pyrrolidinyl)indole,
5-methyl-3-(1-methyl-2-pyrrolidinyl)indole,
7-methyl-3-(1-methyl-2-pyrrolidinyl)indole,
5-methoxy-3-(1-methyl-2-pyrrolidinyl)indole,
4-chloro-3-(1-methyl-2-pyrrolidinyl)indole,
5-chloro-3-(1-methyl-2-pyrrolidinyl)indole,
5-bromo-3-(1-methyl-2-pyrrolidinyl)indole, and
5-fluoro-3-(1-methyl-2-pyrrolidinyl)indole.

By use of appropriate starting indoles in the processes of Youngdale et al., supra, other starting compounds of Formula III are readily obtained.

The compounds of the invention can be converted, by reducing with lithium aluminum hydride, to a compound of the following formula:

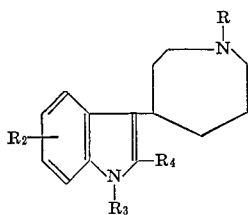

wherein R, $R_2$, $R_3$, and $R_4$ are as given above. The lithium aluminum hydride reduction can be effected in the manner already known in the art using, for example, ether, dioxane, or tetrahydrofuran as an inert solvent.

The compounds of Formula IV are nitrogenous bases and, as such, can exist in the protonated and nonprotonated forms according to the pH of the environment. When R is alkyl the nonprotonated form can be oxidized, with hydrogen peroxide, for example, to form the N-oxide. The N-oxide can exist in both the protonated and nonprotonated forms according to the pH of the environment. The protonated forms can be isolated as acid addition salts which are useful in upgrading the free base and the free base N-oxide forms, that is, nonprotonated forms. Suitable acids for this purpose include hydrochloric acid, sulfuric acid, phosphoric acid, thiocyanic acid, fluosilicic acid, picric acid, Reinecke's acid, azobenzenesulfonic acid, palmitic acid, acetic acid, maleic acid, and cyclohexanesulfamic acid. The acid addition salt can be formed by neutralizing the free base or free base N-oxide with the appropriate acid or by metathesis of a simple acid addition salt such as the hydrochloride or sulfate with another salt of the desired acid. The novel compounds of the invention are useful intermediates, thus, the condensation products obtained from thiocyanic acid addition salts and formaldehyde, according to U.S. Patents 2,425,320 and 2,606,155, are useful as pickling inhibitors, and the fluosilicic acid addition salts are useful as mothproofing agents according to U.S. Patents 1,915,334 and 2,075,359.

The novel compounds of Formula IV wherein R is alkyl can also exist in the form of quaternary ammonium salts such, for example, as those obtained by coordinating the free base form with a loweralkyl halide, for example, methyl, ethyl, propyl, butyl, pentyl, hexyl, heptyl, and octyl chloride, bromide, or iodide, including the isomeric forms thereof. The quaternary ammonium salts are useful for forming the corresponding fluosilicic acid quaternary ammonium salts which are useful as mothproofing agents. These fluosilicic acid salts can be formed by metathesis of a quaternary ammonium salt with an inorganic fluosilicate or by liberating the free base, that is, the quaternary ammonium hydroxide (by treating the quaternary ammonium salt with an equivalent of base, for example, sodium hydroxide) and neutralizing with fluosilicic acid. Higher quaternary ammonium salts, as are obtained as described above by using alkyl halides up to 18 carbons atoms, for example, where the alkyl group is nonyl, decyl, dodecyl, tridecyl, tetradecyl, pentadecyl, hexadecyl, heptadecyl, octadecyl, and the isomeric forms thereof, are surface active compounds useful as wetting agents and as disinfectants.

The compounds of Formula IV have antitumor, antiviral, and antibacterial activity and are useful as stiumlants in mammals, birds, and other animals, for example, in rats, and have activity against KB cells in agar, Newcastle disease virus in chick embryo cells, and *Bacillus subtilis* and *Mycobacterium phlei* in vitro, and can be utilized for decontamination of surfaces infected with these organisms. The compounds of Formula I also have pharmacodynamic activity, being active as anticonvulsants and strychnine antagonists. They also are active against KB cells in agar and Newcastle disease virus in chick embryo cells.

The following example is given by way of illustration, it being understood that the 3-(1-methyl-2-pyrrolidinyl)indole can be substituted by any of the 3-(2-pyrrolidinyl)indoles of Formula III, e.g., those given above. It is to be understood also that the diethyl malonate can be substituted by other dialkyl malonates, for example, dimethyl, dipropyl, diisopropyl, dibutyl, diisobutyl, di-sec.butyl, and di-tert.-butyl malonates.

EXAMPLE 1

*1-methyl-2-oxo-4-(indol-3-yl)-hexahydro-1H-azepine*

A. ETHYL 1-METHYL-2-OXO-4-(INDOL-3-YL)-HEXAHYDRO-1H-AZEPINE-3-CARBOXYLATE

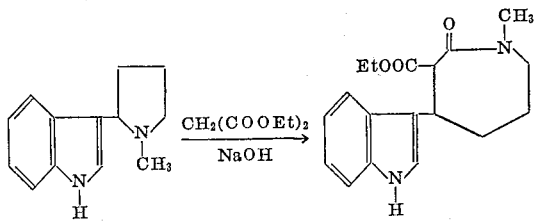

A mixture of 3-(1-methyl-2-pyrrolidinyl)indole (50 g.; 0.25 mole), diethyl malonate (42 g.; 0.262 mole), powdered sodium hydroxide (1.0 g.) and xylene (300 ml.) was allowed to reflux under nitrogen for 31.25 hours. During this period ethanol, formed in the reaction, was removed by distillation. Additional 500-mg. portions of powdered sodium hydroxide were added to the reaction mixture after the reaction had proceeded for 7.5 hours and 25.5 hours. The cooled reaction mixture was poured into dilute acetic acid and the mixture was extracted with chloroform. The extract was washed successively with water, dilute ammonium hydroxide, and saturated aqueous sodium chloride, dried over anhydrous sodium sulfate, and concentrated under reduced pressure. The last traces of xylene were removed from the residue by azeotropic distillation, first with toluene and then benzene. A benzene solution of the resulting brown oil was adsorbed on 2 pounds of neutral alumina and chromatographed. With benzene 4.006 g. of indole, M.P. 51°–54° C., was eluted. Elution of the column with 50% ether-chloroform followed by ethyl acetate crystallization yielded 11.132 g. of ethyl 1-methyl-2-oxo-4-(indol-3-yl) hexahydro-1H-azepine-3-carboxylate (isomer A); M.P. 191–195° C. A sample of this material was recrystallized several times from methanol-ethyl acetate for analysis; M.P. 196.5–198° C. The ultraviolet spectrum (ethanol) had $\lambda_{max}$. 220, 281.5, and 290 m$\mu$ ($\epsilon$ 35,750, 5,950, and 5,150, respectively) with an inflection at 275 m$\mu$ ($\epsilon$ 5,550). The infrared spectrum (mineral oil) showed NH: 3290 cm.$^{-1}$ and C=O: 1740 and 1627 cm.$^{-1}$.

*Analysis.*—Calcd. for $C_{18}H_{22}N_2O_3$: C, 68.77; H, 7.05; N, 8.91. Found: C, 68.36; H, 7.13; N, 8.98.

Concentration of the mother liquors from the above crystallizations yielded a brown oil (9.09 g.) which had practically the same infrared spectrum as the above crystalline product. An ice-cold solution of this material in 150 ml. of absolute methanol was treated with 30 ml. of 0.976 N aqueous sodium hydroxide. The resulting solution was allowed to warm to about 25 C. After a few hours a crystalline precipitate formed. After 24 hours standing, water was added to the mixture which was then concentrated to remove the methanol. The solid which remained was collected by filtration, washed with water, and dissolved in methylene chloride. The methylene chloride solution was washed with water, dried over anhydrous sodium sulfate, and concentrated in vacuo. Crystallization of the residue from methanol-ethyl acetate yielded three crops: 2.888 g., M.P. 209.5–212.5° C.; 0.623 g., M.P. 202.5–205° C.; and 0.132 g., M.P. 194–198° C. An analytical sample of ethyl 1-methyl-2-oxo-4-(indol-3-yl) hexahydro - 1H-azepine - 3-carboxylate (isomer B), M.P. 212.5–214.5° C., was prepared by recrystallizing the first crop from methylene chloride-methanol. The ultraviolet spectrum (methanol) had λmax. 221, 281, and 290 mμ (ε 37,100, 6,150, and 5,350, respectively) with an inflection at 274 mμ (ε 5,700). The infrared spectrum (chloroform and mineral oil) was almost identical to that of insomer A. A mixed melting point with isomer A was taken; M.P. 201–212.5° C.

*Analysis.*—Calcd. for $C_{18}H_{22}N_2O_3$: C, 68.77; H, 7.05; N, 8.91. Found: C, 68.75; H, 7.18; N, 8.92.

B. 1-METHYL-2-OXO-4-(INDOL-3-YL)-HEXAHYDRO-1H-AZEPINE-3-CARBOXYLIC ACID

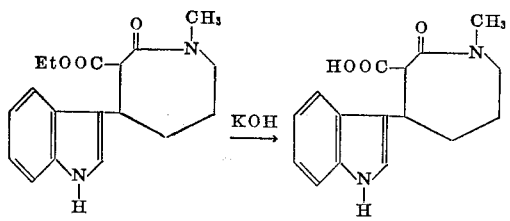

A solution of 1.0 g. (3.18 millimoles) of the ester of Part A (isomer A, M.P. 197–198.5° C.) in 50 ml. of warm, absolute ethanol was treated with 7.33 ml. of 0.433 N aqueous potassium hydroxide. The resulting solution was allowed to reflux gently for 7 hours under nitrogen. The mixture was concentrated under reduced pressure and the residue was suspended in water and the suspension was filtered. The solid obtained in this manner was washed with water and dried in vacuo to yield 64 mg. of starting material, M.P. 187–189° C. The aqueous filtrate was cooled in an ice bath and acidified with concentrated hydrochloric acid. The solid which precipitated was collected by filtration, washed with water, and dried in vacuo to yield 753 mg. (82.9% yield) of 1-methyl-2-oxo-4-(indol-3-yl)-hexahydro-1H-azepine-3-carboxylic acid, M.P. 151.5–154° C. (dec.). The infrared spectrum (mineral oil) showed NH: 3346 cm.$^{-1}$ and C=O: 1714 and 1589 cm.$^{-1}$.

C. 1-METHYL-2-OXO-4-(INDOL-3-YL)-HEXAHYDRO-1H-AZEPINE

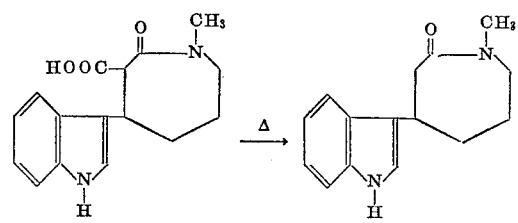

The acid of Part B (0.589 g.; 2.05 millimoles) was heated in a small evacuated flask (14 mm. Hg pressure) at 178° C. for 5 minutes. Decarboxylation occurred rapidly as the compound melted. The cooled, colorless glass that resulted was dissolved in ethyl acetate and crystallized to yield 443 mg. (89.5% yield) of 1-methyl-2-oxo-4-(indol-3-yl)-hexahydro-1H-azepine, M.P. 147–149° C. An analytical sample, M.P. 148–150° C., was prepared by recrystallizing this material three times from ethyl acetate. The ultraviolet spectrum (ethanol) had λmax. 221.5, 281.5, and 290 mμ (ε 38,300, 6,000, and 5,250, respectively) with an inflection at 275 mμ (ε 5,550). The infrared spectrum (mineral oil) showed NH: 3240 cm.$^{-1}$ and C=O: 1625 cm.$^{-1}$.

*Analysis.*—Calcd. for $C_{15}H_{18}N_2O$: C, 74.35; H, 7.49; N, 11.56. Found: C, 74.34; H, 7.37; N, 11.22.

The compound thus produced can be converted to 1-methyl-4-(indol-3-yl)-hexahydro-1H-azepine in the following manner:

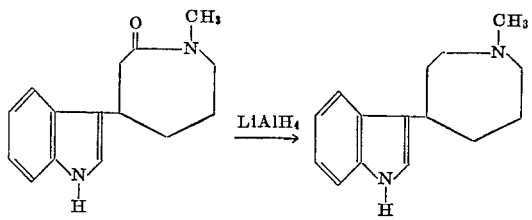

To an ice-cold suspension of 6.0 g. of lithium aluminum hydride in 600 ml. of dry tetrahydrofuran, under nitrogen, was added with stirring, 6.0 g. (24.7 millimoles) of the lactam of Part C. The resulting mixture was allowed to reflux gently with stirring for 6.66 hours and stand at about 25° C. for 18 hours. It was then cooled in an ice bath and treated successively with 6 ml. of water, 6 ml. of 15% aqueous sodium hydroxide, and 18 ml. of water. The inorganic precipitate was collected by vacuum filtration and washed with ether. Concentration of the combined filtrate and washing yielded a colorless oil which was dissolved in ether. The solution was filtered and crystallized from ether-Skellysolve B (technical hexane) to yield two crops: 3.73 g., M.P. 81–85° C., and 1.34 g., M.P. 81–84.5° C. (89.8% yield), of 1-methyl-4-(indol-3-yl)-hexahydro-1H-azepine. The analytical sample, M.P. 81–85° C., was prepared by recrystallizing a portion of this material twice from ether-Skellysolve B. The ultraviolet spectrum (ethanol) had λmax. 222, 282, and 290 mμ (ε 35,200, 5,850, and 5,100, respectively) with an inflection at 275 mμ (ε 5,400). The infrared and nuclear magnetic resonance spectra supported the structure.

*Analysis.*—Calcd. for $C_{15}H_{20}N_2$: C, 78.90; H, 8.83; N, 12.27. Found: C, 78.78; H, 9.10; N, 11.91.

I claim:
1. A compound of the formula:

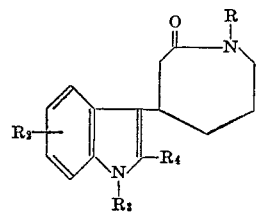

wherein R, $R_3$, and $R_4$ are hydrogen or alkyl of not more than 4 carbon atoms, and $R_2$ is hydrogen, alkyl of not more than 4 carbon atoms, alkoxy of not more than 4 carbon atoms, or halogen.

2. A species according to claim 1, 1-methyl-2-oxo-4-(indol-3-yl)-hexahydro-1H-azepine.

3. A compound of the formula:

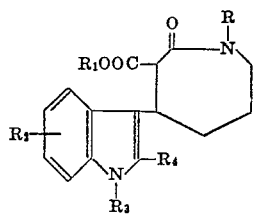

wherein R, $R_3$, and $R_4$ are hydrogen or alkyl of not more than 4 carbon atoms, $R_2$ is hydrogen, alkyl of not more than 4 carbon atoms, alkoxy of not more than 4 carbon atoms, or halogen, and $R_1$ is hydrogen, alkyl of not more than 4 carbon atoms, or alkali metal.

4. A species according to claim 3, ethyl 1-methyl-2-oxo-4-(indol-3-yl)-hexahydro-1H-azepine-3-carboxylate.

5. A species according to claim 3, 1-methyl-2-oxo-4-(indol-3-yl)-hexahydro-1H-azepine-3-carboxylic acid.

6. The process of making compounds of claim 3 wherein $R_1$ is alkyl, which comprises reacting dialkyl malonate in the presence of a strong base with a compound of the formula

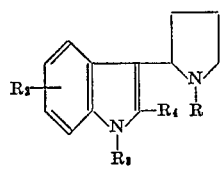

wherein R, $R_2$, $R_3$, and $R_4$ are as given in claim 1.

7. The process of claim 6 in which the resulting compound is subjected to alkaline hydrolysis followed by neutralization to form a compound of Formula II wherein $R_1$ is hydrogen.

8. The process of claim 7 in which the resulting compound is heated as required to effect decarboxylation to form a compound of Formula I.

9. A process for making compounds of claim 1 which comprises subjecting a compound of Formula II to alkaline hydrolysis followed by neutralization to form a compound of Formula II wherein $R_1$ is hydrogen, and heating the resulting compound as required to effect decarboxylation.

10. A process for making compounds of the following formula:

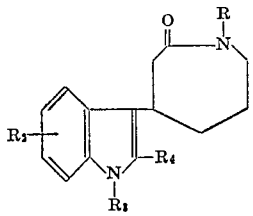

I wherein R, $R_3$, and $R_4$ are hydrogen or alkyl of not more than 4 carbon atoms, and $R_2$ is hydrogen, alkyl of not more than 4 carbon atoms, alkoxy is not more than 4 carbon atoms, or halogen, which comprises heating a compound of the following formula:

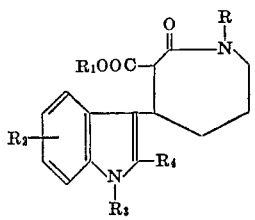

II wherein R, $R_2$, $R_3$, and $R_4$ are as given above, and $R_1$ is hydrogen, as required to effect decarboxylation.

11. A process for making compounds of the following formula:

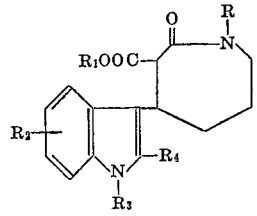

II wherein R, $R_3$, and $R_4$ are hydrogen or alkyl of not more than 4 carbon atoms, and $R_2$ is hydrogen, alkyl of not more than 4 carbon atoms, alkoxy is not more than 4 carbon atoms, or halogen, and $R_1$ is hydrogen, which comprises subjecting a compound of Formula II wherein R, $R_2$, $R_3$, and $R_4$ are as given above, and $R_1$ is alkyl, to alkaline hydrolysis followed by neutralization.

References Cited

UNITED STATES PATENTS 3,354,147  11/1967  Werner _____ 260—239.3

HENRY R. JILES, *Primary Examiner.*

R. T. BOND, *Assistant Examiner.*